(12) United States Patent
Cotter

(10) Patent No.: US 9,551,394 B2
(45) Date of Patent: *Jan. 24, 2017

(54) OVERTRAVEL PRESSURE RELIEF FOR A GAS SPRING

(71) Applicant: DADCO, Inc., Plymouth, MI (US)

(72) Inventor: Jonathan P. Cotter, Dearborn, MI (US)

(73) Assignee: DADCO, INC., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,187

(22) Filed: Sep. 17, 2014

(65) Prior Publication Data

US 2015/0069682 A1 Mar. 12, 2015

Related U.S. Application Data

(63) Continuation-in-part of application No. 14/031,900, filed on Sep. 19, 2013.

(60) Provisional application No. 61/799,719, filed on Mar. 15, 2013.

(51) Int. Cl.
*F16F 9/02* (2006.01)
*F16F 9/43* (2006.01)
*F16F 9/32* (2006.01)

(52) U.S. Cl.
CPC ............. *F16F 9/0281* (2013.01); *F16F 9/02* (2013.01); *F16F 9/0218* (2013.01); *F16F 9/3235* (2013.01); *F16F 9/435* (2013.01); *F16F 2230/24* (2013.01)

(58) Field of Classification Search
CPC .......... F16F 9/02; F16F 9/0218; F16F 9/0281; F16F 9/0227; F16F 9/3235; F16F 9/432; F16F 9/435

USPC .......................................... 267/119, 118, 124
See application file for complete search history.

(56) References Cited

U.S. PATENT DOCUMENTS

| 2,997,325 | A | | 8/1961 | Peterson |
| 3,862,669 | A | | 1/1975 | Lindbert et al. |
| 3,995,842 | A | | 12/1976 | Freitag |
| 4,813,655 | A | | 3/1989 | Hennells |
| 5,069,317 | A | | 12/1991 | Stoll et al. |
| 5,088,698 | A | * | 2/1992 | Wallis ............... 267/119 |
| 5,197,718 | A | | 3/1993 | Wallis |
| 5,386,975 | A | | 2/1995 | Wallis |
| 5,485,987 | A | | 1/1996 | Jobelius et al. |
| 5,735,371 | A | | 4/1998 | Jobelius et al. |

(Continued)

FOREIGN PATENT DOCUMENTS

DE 42 16 573 A1 11/1993
EP 0 959 263 B1 7/2001

(Continued)

OTHER PUBLICATIONS

Committee for the Normalization of Production Means (CNOMO), Press Tools Gas Springs and Accessories, E24.54.815.N, Jun. 1999, 22 pages.

(Continued)

*Primary Examiner* — Thomas J Williams
(74) *Attorney, Agent, or Firm* — Reising Ethington P.C.

(57) ABSTRACT

A piston rod housing assembly for a gas spring includes a piston rod housing having an interior end, an exterior end axially spaced from the interior end, and an overtravel pressure relief passage extending through the piston rod housing and intersecting the exterior end.

22 Claims, 12 Drawing Sheets

(56) References Cited

U.S. PATENT DOCUMENTS

| | | | |
|---|---|---|---|
| 6,431,332 B1 | 8/2002 | Phelizot | |
| 6,971,303 B2 | 12/2005 | Johansson et al. | |
| 7,270,318 B2 * | 9/2007 | Lundahl | 267/119 |
| 9,291,265 B2 * | 3/2016 | Cappeller | F16J 10/00 |
| 9,347,510 B2 * | 5/2016 | Cotter | F16F 9/02 |
| 9,447,834 B2 * | 9/2016 | Cotter | F16F 9/0281 |
| 2010/0132811 A1 | 6/2010 | Cappeller et al. | |
| 2011/0303084 A1 | 12/2011 | Cappeller et al. | |
| 2012/0042770 A1 | 2/2012 | Cappeller et al. | |
| 2013/0228069 A1 * | 9/2013 | Cappeller | F16J 10/00 92/169.1 |
| 2014/0191452 A1 | 7/2014 | Moss | |

FOREIGN PATENT DOCUMENTS

| | | |
|---|---|---|
| EP | 1 241 373 B1 | 10/2007 |
| EP | 2 177 783 A2 | 4/2010 |
| EP | 2 634 451 A1 | 9/2013 |
| ES | 1 041 675 U | 7/1999 |
| FR | 2 778 956 B1 | 11/1999 |
| FR | 2 779 194 A1 | 12/1999 |
| FR | 2 821 401 B1 | 8/2002 |
| GB | 2 261 029 A | 5/1993 |
| JP | 49-70384 | 9/1947 |
| JP | 1 307531 A | 12/1989 |
| WO | WO 03/042571 A1 | 5/2003 |
| WO | WO 2009/063003 A1 | 5/2009 |
| WO | WO 2010/102994 A1 | 9/2010 |
| WO | WO 2010/121946 A1 | 10/2010 |

OTHER PUBLICATIONS

Ressorts a Gaz et Accessoires, Norm E24 Existing in Digitized Version 3D Catia V5, https://normesbis.psa-peugeot-citroen.com/normes/pn/pn00395/fr/pn00395.htm, May 7, 2012, 40 pp.
Renault, Gas Springs, Pneumatic Springs for Press Tooling, EM24.54.700, 35 pages.
Misumi Catalog 2007, 6 pages.
EP Search Report, Application No. 14158102.5-1755/2778465, DADCO, Inc., Mailing Date—Aug. 20, 2014, 11 pages.

* cited by examiner

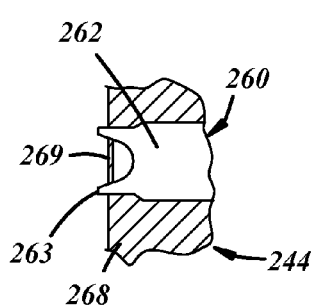
FIG. 7
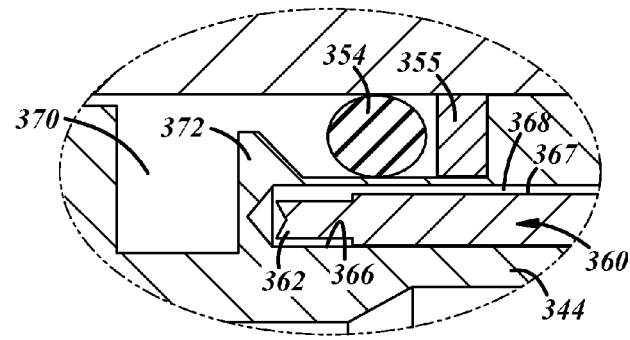
FIG. 9
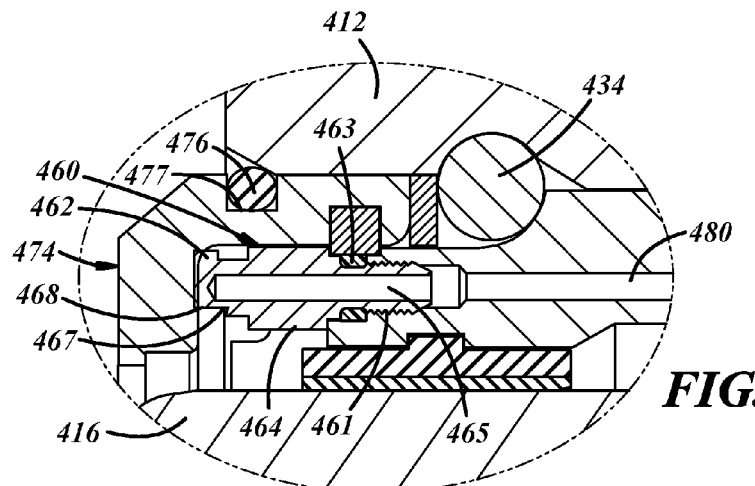
FIG. 11
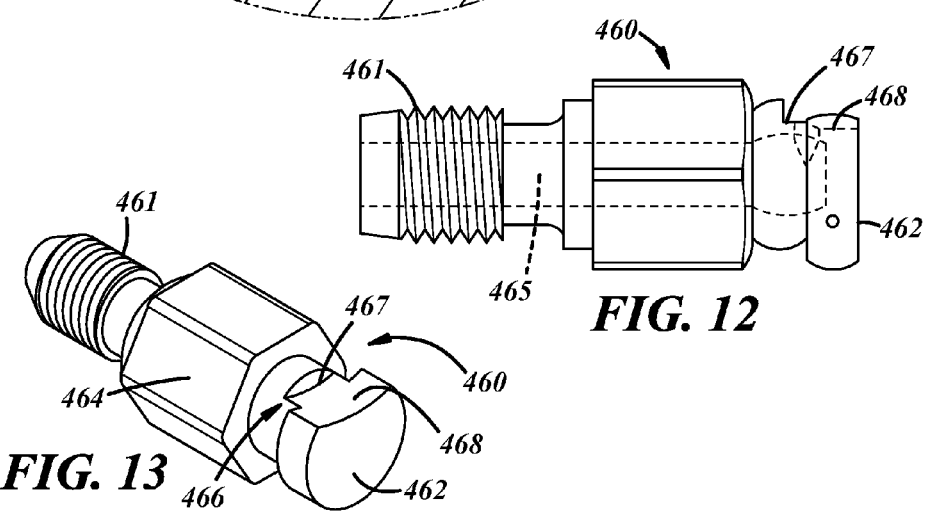
FIG. 12
FIG. 13

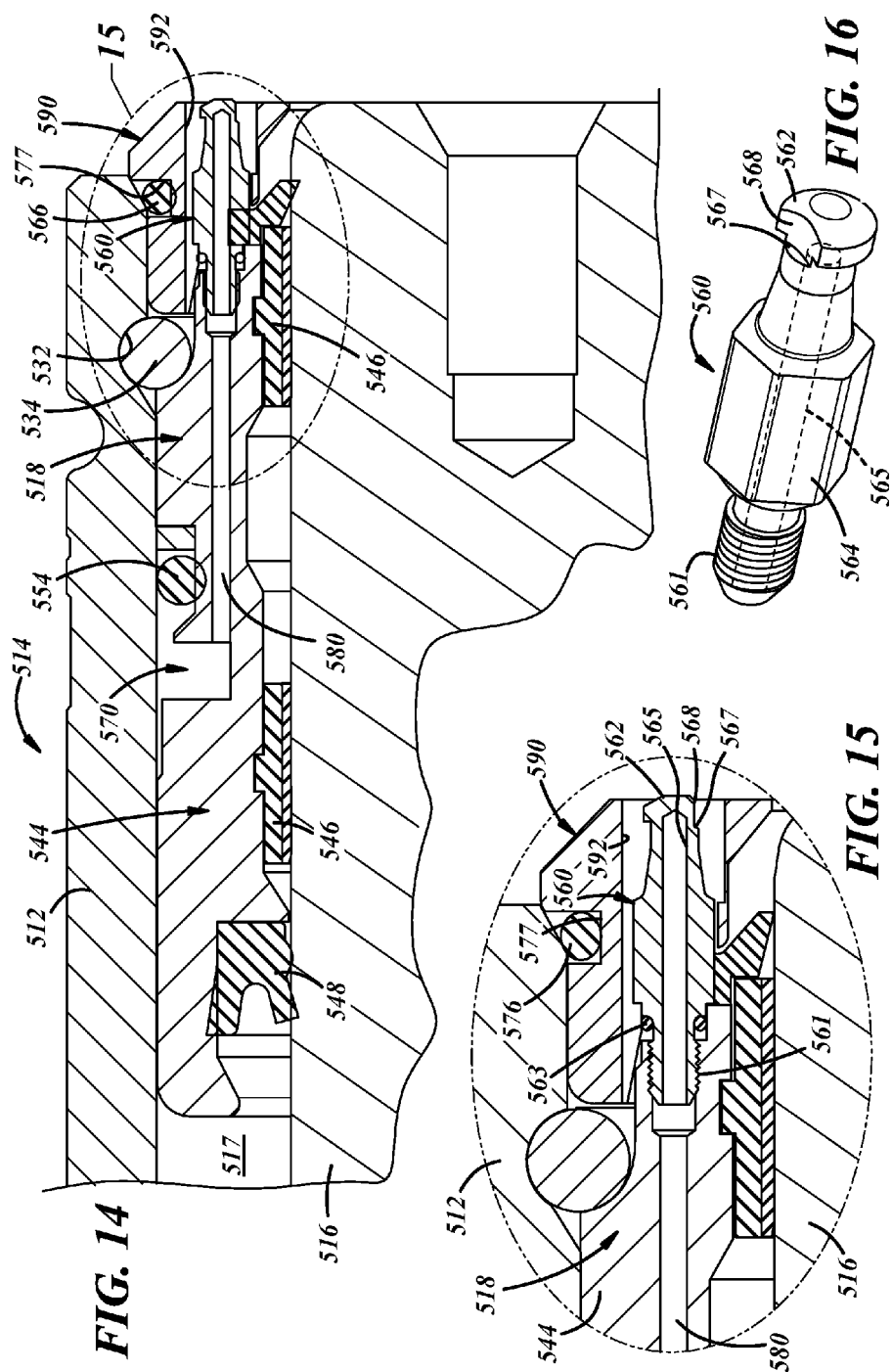

OVERTRAVEL PRESSURE RELIEF FOR A GAS SPRING

This is a continuation-in-part of U.S. patent application Ser. No. 14/031,900, filed Sep. 19, 2013, and of its U.S. Provisional Patent Application No. 61/799,719, filed Mar. 15, 2013, the benefit of both of which are claimed herein and the disclosure of both of which is incorporated herein by reference in their entirety.

TECHNICAL FIELD

This invention relates generally to gas springs and, more particularly, to overtravel pressure relief features for gas springs.

BACKGROUND

Gas springs are well known and have been used in dies of presses for sheet metal stamping operations. For example, gas springs can be used as press cushions, among many other types of applications. A conventional gas spring includes a casing, a piston rod carried in the casing, a bearing and seal housing held in the casing by a retainer to guide and retain the piston rod within the casing, and a pressure chamber to hold pressurized gas, typically nitrogen at an operating pressure of, for example, 2,000 to 5,000 PSI in some applications. The housing includes one or more bearings to guide movement of the piston rod within the casing, and one or more seals to prevent leakage from the pressure chamber. The pressurized gas biases the piston rod to an extended position, and yieldably resists movement of the piston rod from the extended position to a retracted position. But the piston rod may overtravel beyond a design-intent retracted position, and such overtravel may result in undesirable overpressure and other conditions.

SUMMARY

In at least one implementation, a piston rod housing assembly for a gas spring includes a piston rod housing including an interior end, an exterior end axially spaced from the interior end, and an overtravel pressure relief passage extending through the piston rod housing and intersecting the exterior end.

Some potential objects, features and advantages of the gas spring and/or its components set forth herein include providing a device that is readily usable with a wide range of forming equipment, readily permits use of common components among gas springs of different configuration and construction, can be easily serviced and its components replaced as needed, can be used in a wide range of applications having different size and force requirements, is readily adaptable to a wide range of press configurations, includes an overtravel pressure relief feature, and is of relatively simple design, economical manufacture and assembly, robust, durable, reliable and in service has a long useful life. Of course, an apparatus embodying the present invention may achieve none, some, all or different objects, features or advantages than those set forth with regard to the illustrative embodiments disclosed herein.

BRIEF DESCRIPTION OF THE DRAWINGS

The following detailed description of preferred embodiments and best mode will be set forth with regard to the accompanying drawings in which:

FIG. 7 is an enlarged fragmentary sectional view of the housing and member of FIG. 6, wherein the housing is illustrated as ruptured from an overtravel condition;

FIG. 9 is a an enlarged fragmentary sectional view of the end of the pin that is employed in the embodiment of FIG. 8;

FIG. 11 is an enlarged fragmentary sectional view of the embodiment of FIG. 10;

FIG. 12 is a side view of a housing fitting of FIGS. 10 and 11, illustrating the fitting in a ruptured condition;

FIG. 13 is a perspective view of the fitting of FIGS. 10 and 11, illustrating the fitting in an unruptured condition;

FIG. 14 is a fragmentary sectional view of another presently preferred form of an assembly of a piston rod housing and an overtravel pressure relief member with a housing fitting that is directly actuated by a die;

FIG. 15 is an enlarged fragmentary sectional view of a pin of the embodiment of FIG. 14;

FIG. 16 is a perspective view of the pin of the embodiment of FIG. 14;

DETAILED DESCRIPTION OF PREFERRED EMBODIMENTS

Figure 1:
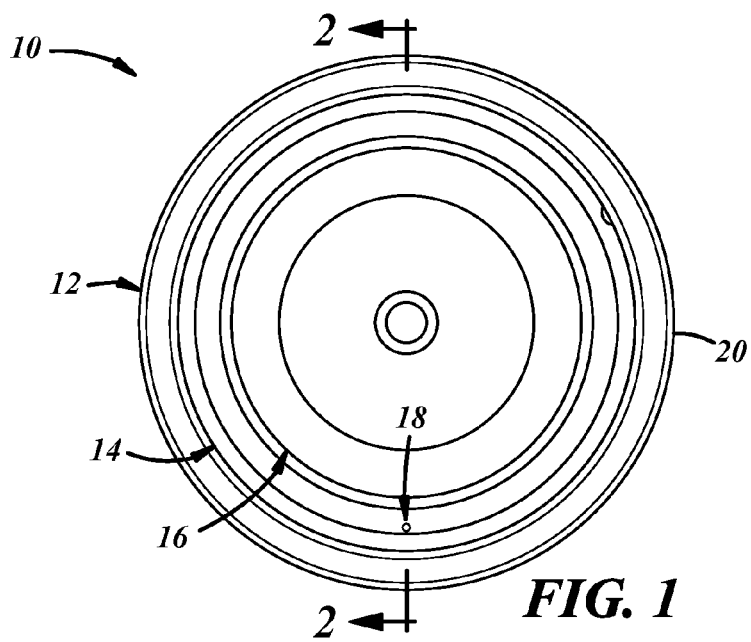
FIG. 1 is a top view of a presently preferred form of a gas spring with an overtravel pressure relief member.

Referring in more detail to the drawings, FIG. 1 illustrates a gas spring 10 that may be used in forming equipment, for example, sheet metal stamping dies and mechanical presses (not shown). In general, the gas spring 10 may include a casing 12, a guide and seal assembly 14 carried by the casing 12, a piston rod 16 carried by the casing 12 and extending through the guide and seal assembly 14, and a pressure chamber 17. An outer axial end of the piston rod 16 may be engageable with or by a die member or another portion of a press or piece of forming equipment (not shown).

For example, one or more of the gas springs 10 may be used in various implementations in forming equipment to provide a moveable component for support of a forming die or a workpiece with a yielding force or a return force. For example, in a binder ring implementation, the gas spring 10 may provide a yielding force against a binder ring of a forming die to hold a metal workpiece while another part of the forming die forms, cuts, stretches, or bends the workpiece. In a lifter implementation, the gas spring 10 may provide a yielding force and return force to lift a workpiece off of a surface of the forming die or to otherwise maintain control of the workpiece. In a cam tool implementation, the gas spring 10 may apply a yielding force to return a cam-activated tool to its home position. Of course, the gas spring 10 may be used in a wide range of other implementations.

According to the present disclosure, the gas spring 10 includes an overstroke or overtravel pressure relief feature 18 in the event of an overtravel condition of the piston rod of a gas spring 10 may be used. As will be discussed in greater detail below, the overtravel pressure relief feature 18 may be part of the guide and seal assembly 14, may be in fluid communication with the pressure chamber 17, and may function to allow pressurized gas to be communicated out of the pressure chamber 17, to provide protection in an overtravel condition, including possible overpressure of gas in the pressure chamber 17. The overtravel pressure relief feature 18 prevents gas in the pressure chamber 17 from exiting the gas spring 10, absent an overtravel condition associated with the gas spring 10. But in the event of an overtravel condition, the overtravel pressure relief feature 18 may be activated to release pressurized gas from within the pressure chamber 17 of the gas spring 10. As used herein, the terminology "overtravel condition" includes a condition where a die member, or any other machine component with which the gas spring 10 interacts, causes the piston rod to be retracted into the case travels beyond a design intent position in the gas spring 10.

Figure 2:
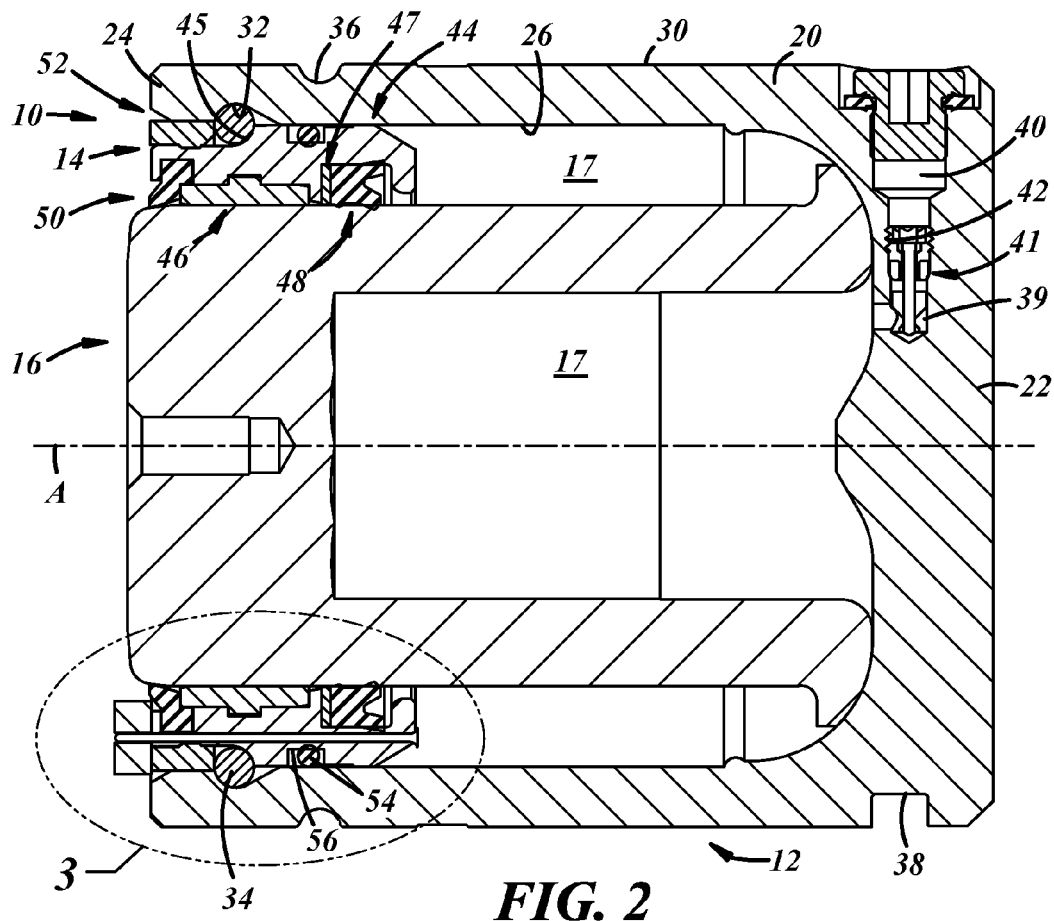
FIG. 2 is an enlarged sectional view of the gas spring of FIG. 1, taken along line 2-2 of FIG. 1, illustrating a piston in an overtravel position with respect to a casing.

With reference to FIG. 2, the casing 12 may include a side wall 20 that may terminate axially at a closed end 22 and at an open end 24 that receives the guide and seal assembly 14 and the piston rod 16 therein. The pressure chamber 17 is established at least in part by the side and end walls 20, 22 to receive a gas under pressure. The closed end 22 may be a separate component attached to the side wall 20, for example by a weld joint, or may be integrally produced with the side wall 20. The side wall 20 of the casing 12 has an inner surface 26 defining at least in part the pressure chamber 17, and an outer surface 30. The casing 12 may be of generally cylindrical shape, for example, wherein at least one of the inner or outer surfaces 26, 30 is cylindrical. The inner surface 26 of the side wall 20 may have a circumferential retainer groove 32 constructed for receipt of a retainer, shown here by way of example as a split ring 34, to maintain the gas spring 10 in its assembled state. To facilitate mounting and locating the gas spring 10 within a press, a pair of longitudinally spaced circumferential grooves 36, 38 may be machined, formed, or otherwise provided in the outer surface 30 of the casing 12 adjacent its ends 22, 24. To admit gas into the gas spring 10, the casing 12 may include a passage or fill port 40 that may be provided through the closed end 22 of the casing 12 in any suitable manner. The fill port 40 may include a threaded passage 42 for coupling of a fill valve 41 (such as a Schrader fill valve) to the casing 12. The closed end 22 of the casing 12 also may include a passage 39 in fluid communication between and with the pressure chamber 17 and the fill port 40.

The guide and seal assembly 14 may be disposed in the open end 24 of the casing 12 and may be sealingly coupled to the casing 12. The assembly 14 may include a piston rod housing 44, a guide bushing 46, a rod seal 48, a seal backup 47, a rod wiper 50, a dust cover 52, an O-ring casing seal 54, and a seal backup 56, all of which may be carried by the housing 44. The guide bushing 46 may be composed of any suitable low friction material, and may be sized to slidably engage the piston rod 16 to guide the piston rod 16 for axial reciprocation within the casing 12. The housing 44 may include a shoulder 45 in an outer surface thereof to cooperate with the split ring 34, which may removably retain the housing 44 in the casing 12.

The piston rod 16 is disposed at least in part in the casing 12 and through the guide and seal assembly 14 for reciprocation along an axis A between extended and retracted positions over a cycle of the gas spring 10 including a retraction stroke and an extension or return stroke. The piston rod 16 is acted on by pressurized gas in the pressure chamber 17 to bias the piston rod 16 toward the extended position, and away from the retracted position. The piston rod 16 extends out of the casing 12 through the guide and seal assembly housing 44, and includes an outer axial end, and an inner axial end disposed in the casing 12 and that may be radially enlarged and engageable with a portion of the piston rod housing 44 to retain the piston rod 16 in the casing 12. The piston rod 16 is in sealing engagement with the rod seal 48 and in sliding engagement with the piston rod bushing 46 for guided relative movement between the extended and retracted positions.

Figure 3:
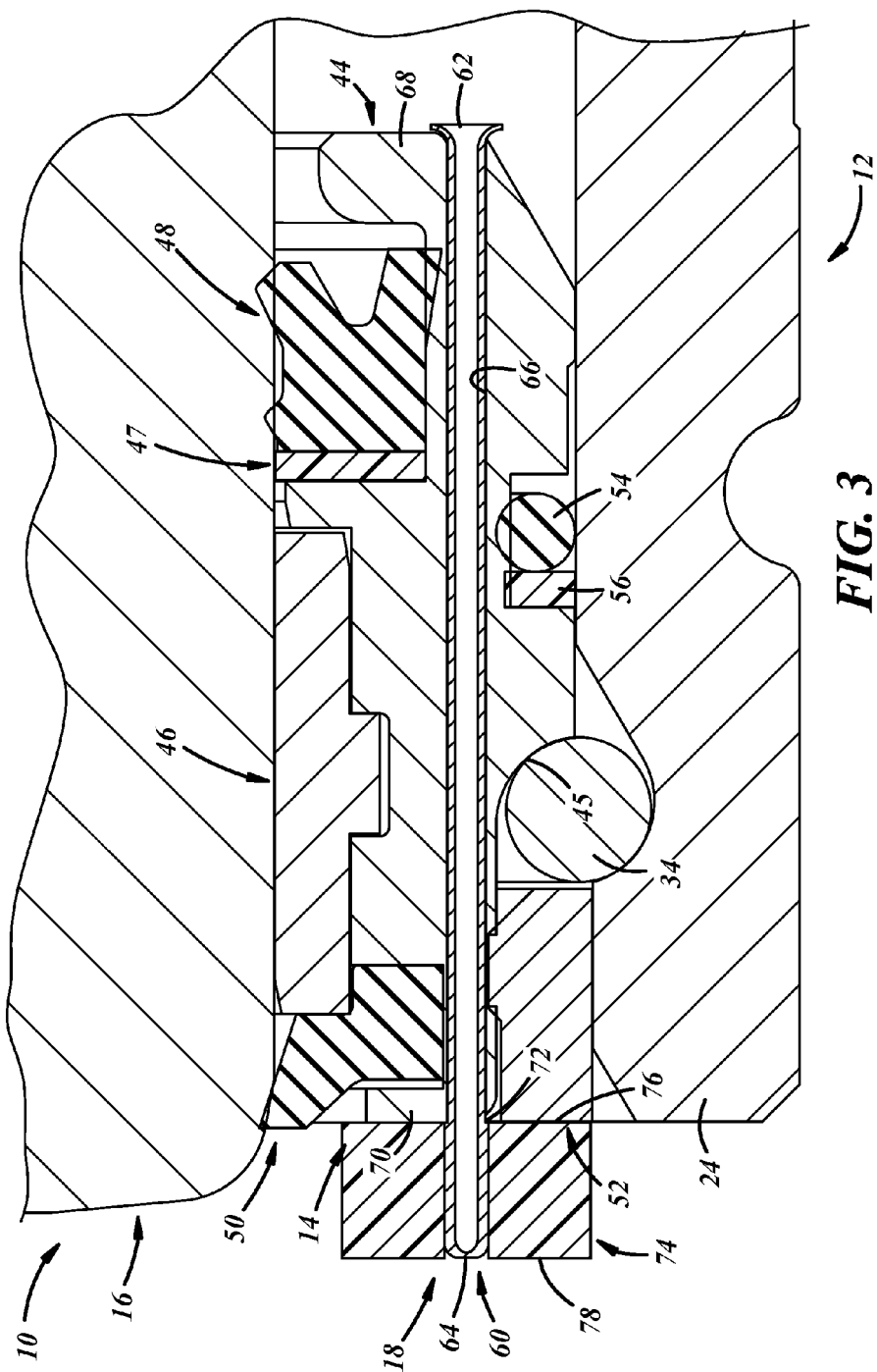
FIG. 3 is an enlarged fragmentary sectional view of a portion of the gas spring of FIG. 1, taken from oval 3 of FIG. 2.

The overtravel pressure relief feature 18 may include a hollow rod, pin, or tube 60 carried by the piston rod housing 44 in communication with the pressure chamber 17 at an interior end 62. The tube 60 extends axially proud of or beyond the housing 44 and the casing 12 at an exterior end 64. The interior end 62 may be open, and the exterior end 64 may be closed. The tube 60 also extends axially beyond the piston 16 when the piston 16 has travelled past a design-intent fully retracted position, as illustrated in FIGS. 2 and 3, such that an axially outer surface of the piston 16 is located between an axially outer surface of the exterior end 64 of the tube 60 and the open end 24 of the casing 12. The tube 60 may be carried in a through passage 66 in the housing 44. The passage 66 may extend axially between and intersects an interior end 68 of the housing 44 and an exterior end 70 of the housing 44, and radially between radially inner and outer peripheries of the housing 44.

The tube 60 may be coupled to the housing 44 in any suitable manner. For example, the tube interior end 62 may be flared to establish a shoulder to engage the interior end 68 of the housing 44 and axially retain the tube 60 to the housing 44. The tube 60 may have an interference fit within the passage 66, for example, by press fit, shrink fit, or in any other suitable manner. The exterior end 64 of the tube 60 may include a shoulder 72 to engage the exterior end 70 of the housing 44 and axially retain the tube 60 to the housing 44. The tube 60 may be axially trapped in the housing 44, for example, where the tube 60 is both flared at the interior end 68 of the housing 44 and has the shoulder 72 at the exterior end 70 of the housing 44, or in any other suitable manner.

The overtravel pressure relief feature 18 also may include a tube protective cover 74 carried around the exterior end 64 of the tube 60. The cover 74 may include a first surface 76 positioned against the exterior end 70 of the housing 44 and a second surface 78 that may project axially beyond or flush with an axially outer surface of the tube end 64. The cover 74 may be composed of a deformable foam thermoplastic, or any other suitable deformable or compressable material.

The gas spring 10 may be assembled in any suitable manner and its various components may be manufactured in any suitable manner and composed of any suitable materials. For example, the casing 12 may be turned, bored, drilled, tapped, and/or otherwise machined from a metal tube and/or metal bar stock such as steel. In another example, the tube 60 may be constructed from, for example, steel, brass, copper, carbon fiber, and/or any other suitable material(s). The closed end of the tube 60 may be closed by a forming operation, by solder, by adhesive, by a plug, and/or in any other suitable manner. The interior end of the tube 60 may be sealed to the housing 44 by a forming operation, by solder, by adhesive, and/or in any other suitable manner. Moreover, a radially outer surface of the tube 60 axially spaced from the interior end may be sealed to a corresponding radially inner surface of the housing passage 66, by a forming operation, by solder, by adhesive, and/or in any other suitable manner.

In assembly, the guide and seal assembly 14 may be pre-assembled, including the overtravel pressure relief tube 60. As set forth above, the tube 60 may be an interference fit, swaged, adhered, and/or coupled to the housing 44 in any other suitable manner. Thereafter, the piston rod 16 may be assembled through the housing 44, and the assembly 14 with the rod 16 therein may be assembled into the casing 12 and retained therein in any suitable manner, for example via assembly of the split ring 34.

In operation, and with respect to FIG. 2, any suitable pressurizing device (not shown) may be coupled to the port 40 to open the valve 14 and introduce pressurized gas into the port 40. Once a desired pressure is reached, the pressurizing device may be retracted to allow the valve 41 to close and thereby seal the pressurized gas within the pressure chamber 17.

Thereafter, the gas spring 10 may be used for any suitable purpose and, in the event of an overtravel condition where a machine component travels beyond a design intent position with respect to the gas spring 10, the machine component strikes the exterior end 64 of the tube 60, resulting in rupture of the tube 60, for instance, at the exterior end 64 of the tube 60. Such rupture will allow pressurized gas in the chamber 17 to escape through the ruptured tube 60 to the exterior of the gas spring.

In one embodiment, the tube 60 also could function as an overpressure device, for example, wherein the wall thickness of the end portion 64 of the tube 60 is suitably calibrated for a correct or desired failure pressure.

Figure 4:
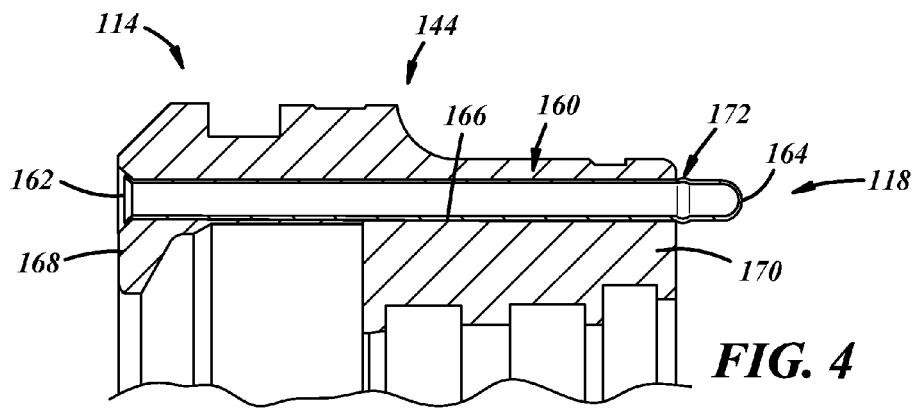
FIG. 4 is a fragmentary sectional view of a presently preferred form of an assembly of a piston rod housing and an overtravel pressure relief member.
Figure 5:
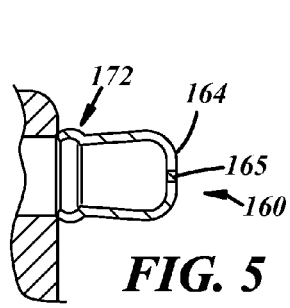
FIG. 5 is an enlarged fragmentary sectional view of the housing and member of FIG. 4, wherein the member is illustrated as ruptured from an overtravel condition.

FIGS. 4 and 5 illustrate another presently preferred form of an assembly 114 (FIG. 4). This form is similar in many respects to the form of FIGS. 1-3 and like numerals between the forms generally designate like or corresponding elements throughout the several views of the drawing figures. Accordingly, the descriptions of the embodiments are incorporated by reference into one another in their entireties, and a description of the common subject matter generally may not be repeated here.

The assembly 114 may include a piston rod housing 144, and an overtravel pressure relief feature 118 carried by the housing 144. Other portions, like a seal, bearing, and wiper are not shown. The feature 118 may include a hollow rod or tube 160 carried by the piston rod housing 144 and may include an interior end 162, and may extend axially proud of or beyond the housing 144 at an exterior end 164. The tube 160 may be carried in a through passage 166 in the housing 144 that extends axially between and intersects an interior end 168 of the housing 144 and an exterior end 170 of the housing 144.

The tube interior end 162 may be recessed within the interior end 168 of the housing 144 and may be flared to establish a shoulder to engage the housing 144. The tube exterior end 162 may include an enlarged annular bead 172 to engage the exterior end 170 of the housing 144. The tube 160 may be axially trapped to the housing 144 between the flared interior end 168 and the bead 172 at the exterior end 162. The bead 172 may be produced by axially compressing the tube 160, for example, when the tube 160 is manufactured, or after the tube 160 has been assembled to the housing 144.

With reference to FIG. 5, the exterior end 164 of the tube 160 is configured to rupture when struck. For example, in the event of an overtravel condition where a machine component travels beyond a design intent position, the machine component strikes the exterior end 164 of the tube 160, resulting in rupture of the tube 160, for instance, at the exterior end 164 of the tube 160. Accordingly, the exterior end 164 may develop an aperture 165, which may be a crack, hole, or any other suitable passage to allow pressurized gas to escape therethrough. In any case, such rupture will allow pressurized gas in a pressure chamber to escape through the ruptured tube 160.

Figure 6:
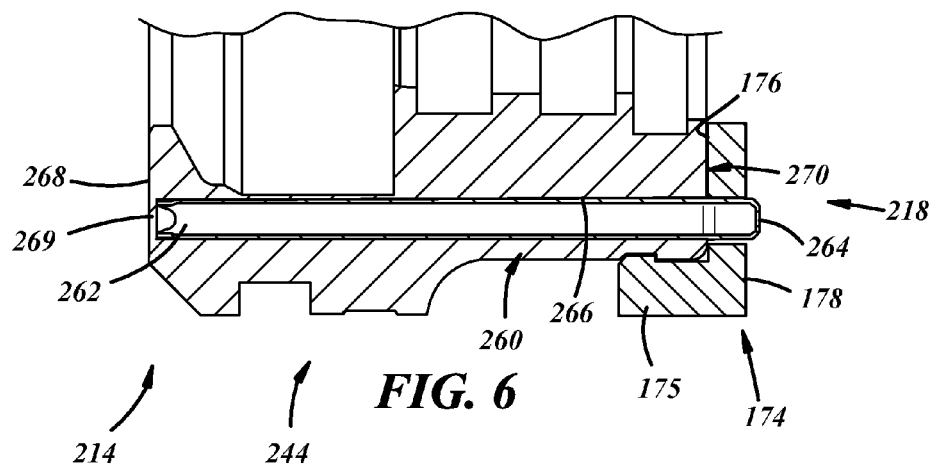
FIG. 6 is a fragmentary sectional view of another presently preferred form of an assembly of a piston rod housing and an overtravel pressure relief member.

FIGS. 6-7 illustrate another presently preferred form of an assembly 214 (FIG. 6). This form is similar in many respects to the forms of FIGS. 1-5 and like numerals between the forms generally designate like or corresponding elements throughout the several views of the drawing figures. Accordingly, the descriptions of the embodiments are incorporated by reference into one another in their entireties, and a description of the common subject matter generally may not be repeated here.

The assembly 214 may include a piston rod housing 244, and an overtravel pressure relief feature 218 carried by the housing 244. The feature 218 may include a plunger pin 260 carried by the piston rod housing 244 and may include an interior end 262, and may extend axially proud of or beyond the housing 244 at an exterior end 264. In the illustrated example, the pin 260 is hollow and open at both ends but, as discussed herein below, the pin 260 may be solid. The exterior end 264 may be enlarged and configured for press fit retention to the piston rod housing 244 during an overtravel condition.

For example, the plunger pin 260 may be slidably carried in a blind passage 266 in the housing 244 that extends axially between ends 268, 270 of the housing 244, and intersects the exterior end 270. The pin 260 may be installed with an enlarged exterior end 264 in an interference fit condition with the passage 266. The interference fit may be used to hold the pin in place, especially because since the gas spring may be inverted. The interference fit does not create a large enough force to counteract the function of piercing the housing when the rod 260 is driven axially inwardly during an overtravel condition. At the other end, the passage 266 includes a bottom end or wall 269 at the interior end 268 of the housing 244, and to which the interior end 262 of the rod 260 is proximate or axially adjacent. The bottom wall 269 is relatively thin; thick enough to not rupture under forces due to normal operating pressures within a gas spring pressure chamber, but thin enough to facilitate being ruptured by the plunger pin 260 during an overtravel condition. The pin 260 should be of sufficient wall thickness and material strength so that it is stiff enough to transmit longitudinal displacement along its length and not deform itself.

Accordingly, and with reference to FIG. 7, the rod 260 is configured to rupture the bottom thin wall 269 during an overtravel condition. For example, the interior end 262 of the rod 260 may have one or more spikes 263 that may pierce the bottom wall 269 when the rod 260 is driven axially inwardly during an overtravel condition. In other embodiments, the interior end 262 of the rod 260 may be pointed or of any other suitable geometry and may have any other suitable features to pierce or otherwise cut or rupture the bottom wall 269.

In the event of an overtravel condition where a machine component travels beyond a design intent position, the machine component strikes the exterior end 264 of the plunger pin 260, thereby driving the plunger pin 260 into the housing 244 so that the interior end 262 of the rod 262 ruptures the thin wall portion 269 of housing 244. Such rupture will allow pressurized gas in a pressure chamber to escape through the hollow or flatted plunger pin 260.

Figure 6B:
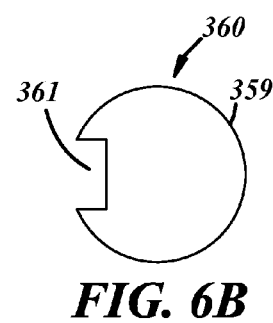
FIG. 6B is an end view of the member of FIG. 6A.
Figure 6A:
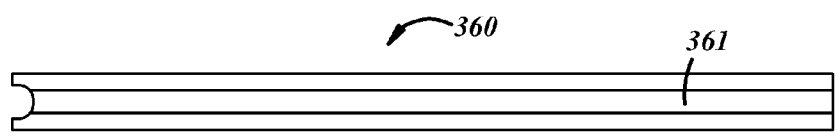
FIG. 6A is a side view of another presently preferred form of an overtravel pressure relief member.

In the embodiment illustrated in FIGS. 6A and 6B, a pin 360 may include a cylindrical or circular body 359 and an axially extending radial relief 361, such as a groove or a flat. Accordingly, when the pin 360 is carried in the passage 266 (FIG. 6), a fluid path may be defined between the relief 361 and the passage 266 (FIG. 6). Accordingly, in the event of an overtravel condition, pressurized gas could flow through the ruptured thin wall 269 (FIG. 6), along the relief 361 and out of the gas spring. In other embodiments, the pin 360 may be solid and axially relieved in any other suitable manner, for instance, with one or more external flutes, helical grooves, or any other suitable reliefs.

The overtravel pressure relief feature 218 also may include a protective cover 174 carried around the exterior end 264 of the rod 260. In this embodiment, the cover 174 may be a dust cover that may be used to replace the dust cover 52 of the embodiment of FIGS. 1-3. In other words, the protective cover 174 may double as a dust cover. The protective cover 174 includes a first surface 176 positioned against the exterior end 270 of the housing 244 and a second surface 178 that is recessed below an axially outer surface of the exterior end 264 of the rod 260. The cover 174 also may include an axially extending annular portion 175 interengaged with the piston rod housing 244 in any suitable manner, for instance, via interengaging axial shoulders or beads as illustrated.

Figure 8:
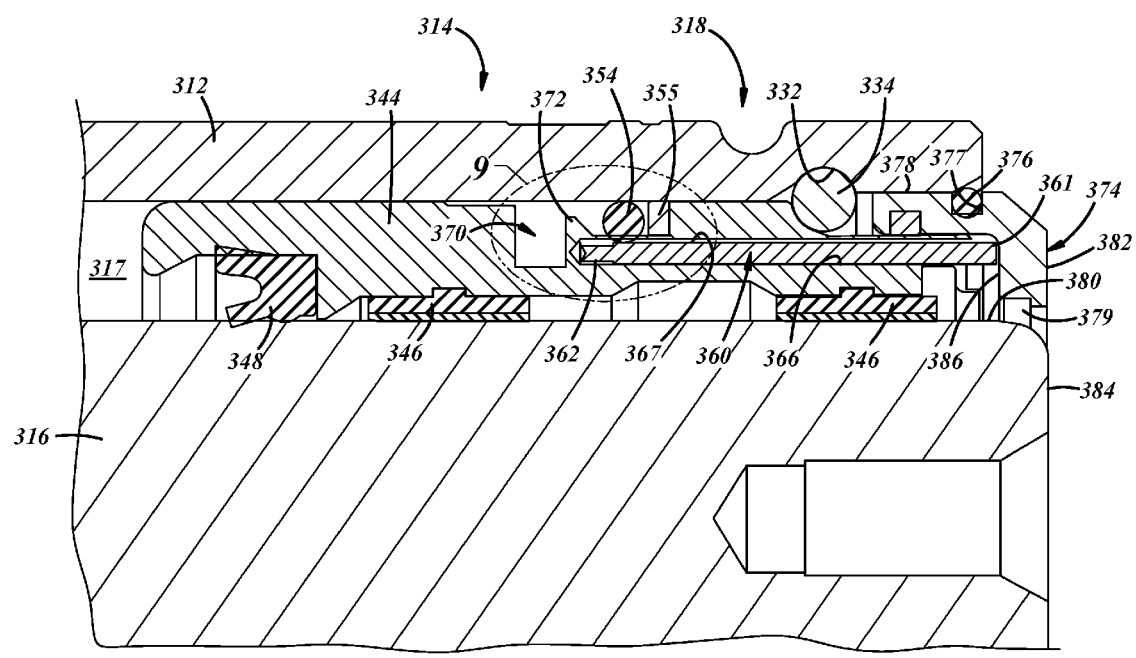
FIG. 8 is a fragmentary sectional view of another presently preferred form of an assembly of a piston rod housing and an overtravel pressure relief member employing a pin that is directly actuated by a plate driver.

FIGS. 8 and 9 illustrate another presently preferred form of an assembly 314 in which an overtravel pressure relief member may employ a pin that may be directly activated by a plate driver. This form is similar in many respects to the forms of FIGS. 1-7 and like numerals between the forms generally designate like or corresponding elements throughout the several views of the drawing figures. Accordingly, the descriptions of the embodiments are incorporated by reference into one another in their entireties, and a description of the common subject matter generally may not be repeated here.

The assembly 314 may include a piston rod housing 344, and an overtravel pressure relief feature 318 carried by the housing 344. The piston rod housing 344 may be positioned between the piston rod 316 and the interior of the casing 312. One or more guide bushings 346 may positioned between the outer surface of the piston rod 316 and the inside surface of the piston rod housing 344. An O-ring casing seal 354 and a support ring 355 may be positioned between the outer surface of the piston rod housing 344 and the inner surface of the casing 312, and a rod seal 348 may be positioned between the inside surface of the piston rod housing 344 and the outer surface of the piston rod 316. The casing seal 354 and the rod seal 348 prevent the escape of gas from the pressure chamber 317 to the atmosphere. A retainer groove 332 may be formed on the inner surface of the casing 312, and a split ring 334 may be positioned in the retainer groove 332 to maintain the piston rod housing 344 in its assembled state in the housing 344.

A housing fitting or relief pin 360 having a forward or exterior end 361 and a rearward or interior end 362 may be carried in an axially extending blind bore 366 formed in the piston rod housing 344. The rearward end 362 may have a reduced diameter portion compared to the rest of the pin 360. A longitudinal relief 367 (for example, a flat or a groove) may be formed on the outer surface of the pin 360 from the forward end 361 to the rearward end 362 so that a pressure relief passage 368 may be formed between the relief 367 and the blind bore 366 in the piston rod housing 344 when the pin 360 is positioned in the blind bore 366. An annular channel 370 may be formed in the piston rod housing 344 that is in fluid communication with the pressure chamber 317 and is normally at the same pressure as the gas in the pressure chamber 317. A boundary wall 372 may separate the annular channel 370 from the rearward end of the axially extending blind bore 366 to prevent the escape of gas from the annular channel 370 through the axial bore 366. The wall 372 may be disposed axially between the annular channel 370 and the seal 354, and may extend radially outward with respect to the bore 366. The interior or rearward end 362 of the pin 360 may be configured to pierce through the boundary wall 372 in response to an axial force applied to the pin 360.

A plate driver 374 may be mounted on the piston rod housing 344 and a plate seal 376 may be positioned in a groove 377 formed in the plate driver 374 and may form a seal between the cylindrical outer surface 378 of the plate driver 374 and the interior surface of the casing 312. A rod wiper 379 may be mounted between the outer surface of the piston rod 312 and a facing surface 384 of the plate driver 374. The plate driver 374 has an outwardly facing drive surface 382 that may be coplanar with the outward facing drive surface 384 of the piston rod 312, and an inwardly facing bearing surface 386 that may bear on the forward or exterior end 361 of the pin 360.

With reference to FIG. 9, the interior or rearward end 362 of the pin 360 is positioned adjacent to the boundary wall 372 formed in the piston rod housing 344 and is configured to pierce or otherwise breach the boundary wall 372 in response to being driven into the boundary wall.

In the event of an overtravel condition where a machine component travels beyond a design intent position, the machine component strikes the plate driver 374. The plate driver 374 is free to travel rearward a sufficient distance to drive the interior or rearward end 362 of the pin 360 through the boundary wall 372 into the annular channel 370. The resulting breach in the boundary wall 372 will allow pressurized gas in the pressure chamber 317 to escape from the annular channel 370 through a relief path formed by the passageway 368 between the longitudinal relief 367 on the pin 360 and the bore 366 from the annular channel 370 to the outside atmosphere, for example, around the driver 374 or through any suitable passage or relief therein.

Figure 10:
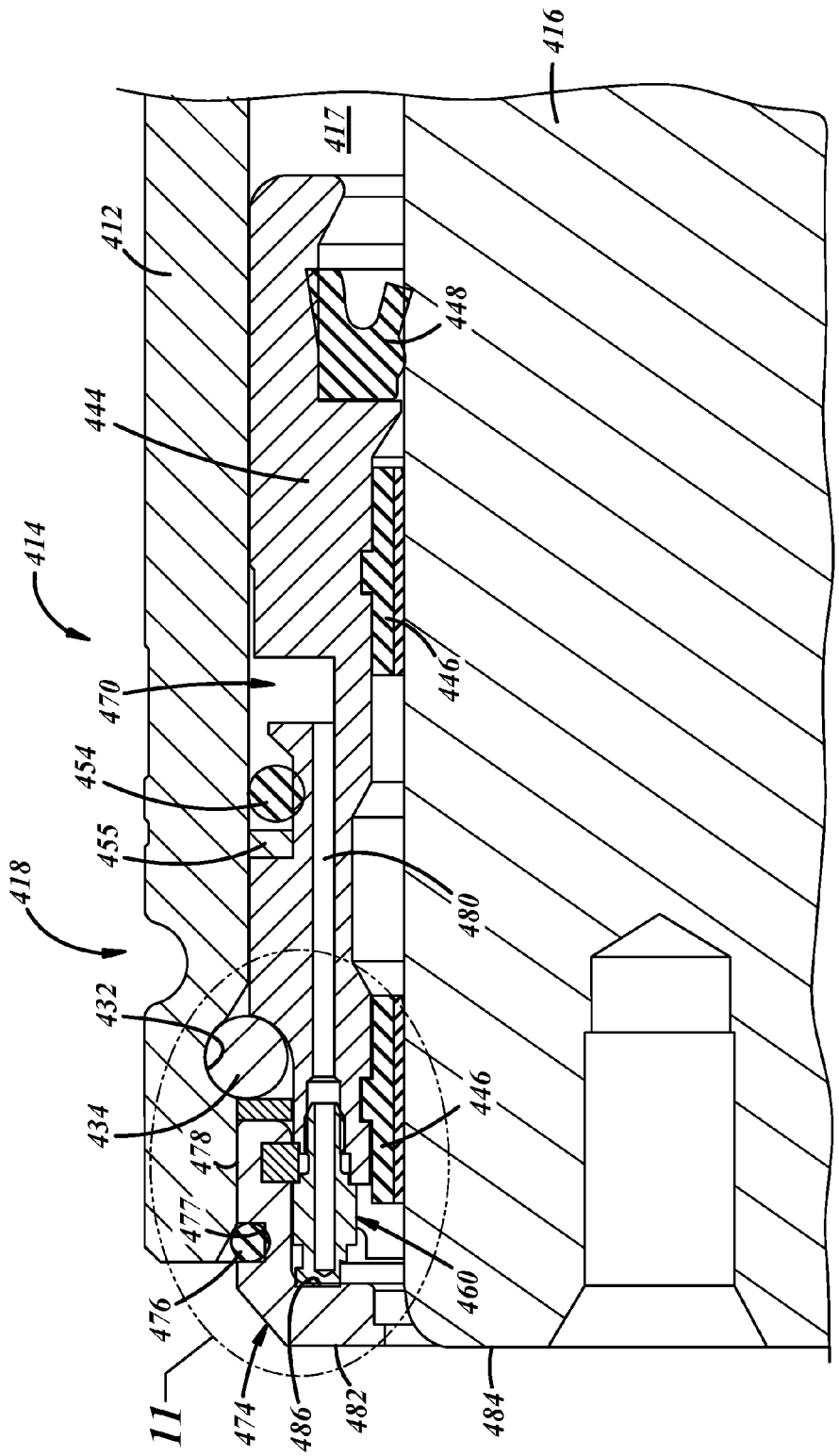
FIG. 10 is a fragmentary sectional view of another presently preferred form of an assembly of a piston rod housing and an overtravel pressure relief member employing a housing fitting that is directly actuated by a plate driver.

FIGS. 10 and 11 illustrate another presently preferred form of an assembly 414 in which an overtravel pressure relief member may employ a breakable fitting or pin that may be directly activated by a plate driver. This form is similar in many respects to the forms of FIGS. 1-9 and like numerals between the forms generally designate like or corresponding elements throughout the several views of the drawing figures. Accordingly, the descriptions of the embodiments are incorporated by reference into one another in their entireties, and a description of the common subject matter generally may not be repeated here.

The assembly 414 may include a piston rod housing 444, and an overtravel pressure relief feature 418 carried by the housing 444. The feature 418 may comprise the piston rod housing 444 that may be positioned between the piston rod 416 and the interior of the casing 412. The piston rod housing 444 may have one or more guide bushings 446 that may positioned between the outer surface of the piston rod 416 and the inside surface of the piston rod housing 444. A casing seal 454 and a seal backup 455 may be positioned between the outer surface of the piston rod housing 444 and the inner surface of the casing 412, and a rod seal 448 may be positioned between the inside surface of the piston rod housing 444 and the outer surface of the piston rod 416. The casing seal 454 and the rod seal 448 prevent the escape of pressurized gas from the pressure chamber 417 to atmosphere. A retainer groove 432 may be formed on the inner surface of the casing 412, and a split ring 434 may be positioned in the retainer groove 432 to maintain the piston rod housing 444 in its assembled state.

An annular channel 470 may be formed in the piston rod housing 444 that is in fluid communication with the pressure chamber and is normally at the same pressure as the gas in the pressure chamber. An axial bore 480 may extend through the piston rod housing 444 from the annular channel 470 to the interior or rearward end of a breakable fitting or pin 460, best seen in FIGS. 11-13. A plate driver 474 may be mounted on the piston rod housing 444 and may be formed from material such as iron or steel, or other suitable high strength material. A plate seal 476 may be positioned in a groove 477 formed in the plate driver 474 and may form a seal between the outer cylindrical surface 478 of the plate driver 474 and the interior surface of the casing 412. The plate driver 474 has an outward facing drive surface 482 that may be parallel with the outward facing drive surface 484 of the piston rod 416, and an inward facing bearing surface 486 that may bear on the exterior or forward end or head of the breakable fitting or pin 460. The outward facing drive surface 482 of the plate driver may be orthogonal to the axis or normal direction of travel of the piston rod in the casing.

The breakable fitting or pin 460 is shown in detail in FIGS. 12 and 13. The breakable fitting or pin 460 is not limited to a slender design as shown in connection with FIG. 8, but may be plug shaped and may have a head and an enlarged diameter body as described herein. The breakable pin 460 may be formed of metal and may have a head 462 and a body portion 464 with an axial blind bore 465. The bore 465 extends from a location just behind a forward or outer axial end wall of the head 462 to a rearward or inner axial end of the elongated body 464. In other words, the bore 465 may be a blind passage open to an open end of the pin 460 and closed at a closed end of the pin 460.

A portion of the head 462 and the body 464 of the fitting or pin 460 may included a relieved portion 468 to create a weakening 467 in the body between the relieved portion 468 and the bore 465. The relieved portion may be a chordally extending flat that may be milled into the pin 460, or otherwise machined, formed, or provided therein. The weakening 467 could be a single feature or multiple features to allow rupture or shear but not detachment. The fitting or pin 460 also may include a threaded portion 461 for threaded coupling to a corresponding threaded portion of the bore 465. Also, the pin 460 may carry a seal 463 between the threaded portion 461 and the head 462 to seal the pin to the bore 465.

In the event of an overtravel condition where a machine component travels beyond a design intent position, the machine component strikes the plate driver 474. The plate driver 474 is free to travel rearward a sufficient distance to impact the head 462 of the breakable pin 460, rupturing the weakening 467 in the body. The rupture will allow pressurized gas in a pressure chamber to escape from the annular channel 470 and through the axial bore in the piston rod housing 444, through the bore 465 in the breakable pin 460, and through the rupture that occurs in the breakable pin to the atmosphere.

FIGS. 14-16 illustrate another presently preferred form of an assembly 514 in which an overtravel pressure relief member may employ a breakable housing fitting that may be directly activated by a die. This form is similar in many respects to the forms of FIGS. 1-13 and like numerals between the forms generally designate like or corresponding elements throughout the several views of the drawing figures. Accordingly, the descriptions of the embodiments are incorporated by reference into one another in their entireties, and a description of the common subject matter generally may not be repeated here.

Referring to FIGS. 14 and 15, the assembly 514 may include a piston rod housing 544, and an overtravel pressure relief feature 518 carried by the housing 544. The feature 518 may be positioned between the piston rod 516 and the interior of the casing 512. The piston rod housing 544 may comprise one or more guide bushings 546 that may be positioned between the outer surface of the piston rod 516 and the inside surface of the piston rod housing 544. A casing seal 554 may be positioned between the outer surface of the piston rod housing 544 and the inner surface of the casing 512, and a rod seal 548 may be positioned between the inside surface of the piston rod housing 544 and the outer surface of the piston rod 516. The casing seal 554 and the rod seal 548 prevent the escape of pressurized gas from a pressure chamber 517 to the atmosphere.

An annular channel 570 may be formed in the piston rod housing 544 that is in fluid communication with the pressure chamber 517 and is normally at the same pressure as the gas in the pressure chamber 517. An axial passage 580 may extend through the piston rod housing 544 from the annular channel 570 to the rearward end of a breakable pin or housing fitting 560. A retainer groove 532 may be formed on the inner surface of the casing 512, and a split ring 534 may be positioned in the retainer groove 532 to maintain the piston rod housing 544 in its assembled state. A plastic protector 590 may be inserted into the open end of the casing 512 and surrounds the forward end of the piston rod housing 544. The plastic protector 590 may extend beyond the end of the open end of the casing 512 and may contain a mounting aperture 592 that receives a breakable housing fitting 560.

The breakable housing fitting 560 is shown in detail in FIG. 16. The breakable housing fitting 560 may have a head 562 and an elongated body 564 that may be formed with an axial blind bore 565. The bore 565 extends from a location just behind a forward or outer axial end wall of the head 562 to a rearward or inner axial end of the elongated body 564. In other words, the bore 565 may be a blind passage open to an open end of the pin 560 and closed at a closed end of the pin 560. The bore 565 may extend from just behind the head 562 to the rearward end 566 of the elongated body 564.

The head 562 may have a relieved portion 568 which reduces the thickness of the material of the body 564 between the relieved portion 568 and the bore 565, and as a result creates a weakening 567 in the body 564 in the region of the relieved portion 568. The bore 565 communicates with the axial passage 580 through the piston rod housing 544 that communicates with the annular channel 570 formed in the piston rod housing 544. The relieved portion may be a chordally extending flat that may be milled into the pin 560, or otherwise machined, formed, or provided therein. The pin 560 also may include a threaded portion 561 for threaded coupling to a corresponding threaded portion of the bore 565. Also, the pin 560 may carry a seal 563 between the threaded portion 561 and the head 562 to seal the pin 560 to the bore 565.

In the event of an overtravel condition where a machine component travels beyond a design intent position, the machine component strikes the end of the plastic protector 590. The plastic protector 590 will deform under the force of the machine component, and continued travel of the machine component will impact the head 562 of the breakable housing fitting 560, fracturing or rupturing the weakening 567 in the fitting 560. The rupture will allow pressurized gas in a pressure chamber to escape from the annular channel 570, through the axial passage 580 in the piston rod housing 544, through the bore 565 in the breakable housing fitting 560, and through the break that occurs in the weakening 567 in the rupturable housing fitting 560 to the atmosphere.

Figure 17:
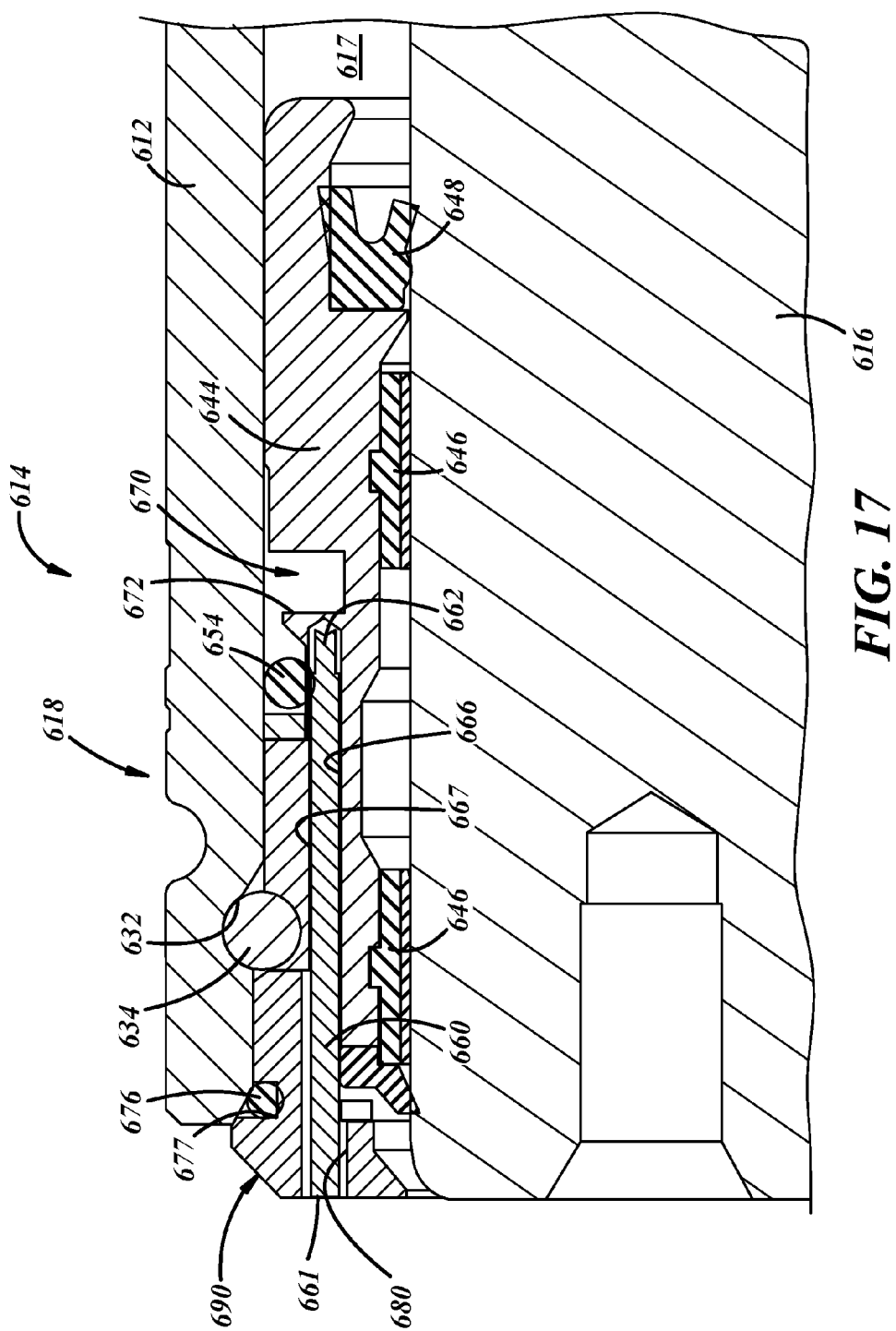
FIG. 17 is a fragmentary sectional view of another presently preferred form of an assembly of a piston rod housing and an overtravel pressure relief member with a pin that is directly actuated by a die.

FIG. 17 illustrates another presently preferred form of an assembly 614 in which an overtravel pressure relief member may employ a pin that may be directly activated by a die. This form is similar in many respects to the forms of FIGS. 1-16 and like numerals between the forms generally designate like or corresponding elements throughout the several views of the drawing figures. Accordingly, the descriptions of the embodiments are incorporated by reference into one another in their entireties, and a description of the common subject matter generally may not be repeated here.

The assembly 614 may include a piston rod housing 644, and an overtravel pressure relief feature 618 carried by the housing 644. The feature 618 may comprise a piston rod housing 644 that may be positioned between the outer cylindrical surface of the piston rod 616 and the interior of the casing 612. The piston rod housing 644 may comprise a body that may have one or more guide bushings 646 that may positioned between the outer surface of the piston rod 616 and the inside surface of the piston rod housing 644. A casing seal 654 may be positioned between the outer surface of the piston rod housing 644 and the inner surface of the casing 612, and a rod seal 648 may be positioned between the inside surface of the piston rod housing 644 and the outer surface of the piston rod 616. The casing seal 654 and the rod seal 648 prevent the escape of pressurized gas from the pressure chamber 617 to atmosphere.

An annular channel 670 may be formed in the piston rod housing 644 that is in fluid communication with the pressure chamber 617. A boundary wall 672 may separate the annular channel 670 from an axially extending blind bore 666 formed in the piston rod housing 644. A retainer groove 632 may be formed on the inner surface of the casing 612, and a split ring 634 may be positioned in the retainer groove 632 to maintain the piston rod housing 644 in its assembled state. The boundary wall 672 may be disposed axially between the annular channel 670 and the seal 654, and may extend radially outward with respect to the blind bore 666.

A plastic protector 690 may be inserted into the open end of the casing 616 and surrounds the forward end of the piston rod housing 644. The plastic protector 690 may extend beyond the end of the open end of the casing 616 and may contain an axial bore 680 that receives an elongated pin 660.

The elongated pin 660 may be similar to the pin 360 shown in FIGS. 8 and 9. The elongated pin 660 has a forward end 661 and a rearward end 662 and a longitudinal relief, for example a flat 667, may be formed on the outer surface of the pin 660 so that a pressure relief passage may be formed between the 667 flat and the axial bore 666 in the piston rod housing 644 when the pin 660 is positioned in the axial bore 666. The rearward end 662 of the elongated pin 660 may be configured to pierce through or otherwise rupture the boundary wall 672 in response to an axial force applied to the pin 660.

In the event of an overtravel condition where a machine component travels beyond a design intent position, the machine component strikes the end of the plastic protector 690. The plastic protector 690 will deform under the force of the machine component, and continued travel of the machine component will impact the forward end of the pin 660 and will drive the rearward end 662 of the pin 660 through the boundary wall 672 into the annular channel 670. The breach in the boundary wall 672 will allow pressurized gas in the pressure chamber to escape from the annular channel 670 through the passageway formed between the longitudinal flat 667 on the pin 660 and the bore 666 through the piston rod housing 644 to atmosphere.

The embodiments of FIGS. 8, 9, and 17 include an overtravel pressure relief pin 360, 660 carried in a blind bore 366, 666 of a piston rod housing 344, 644 and having an exterior end 361, 661 for contact with a driving member and an interior end 362, 662 for rupturing a portion of the piston rod housing 344, 644 when the driving member drives the pin 360, 660 further into the piston rod housing 344, 644, and wherein the pin 360, 660 may have a longitudinally extending relief 367, 667 to define an overpressure relief passage between the pin 360, 660 and the piston rod housing 344, 644.

The embodiments of FIGS. 10-16 include an overtravel pressure relief member pin 460, 560 carried in a through bore 480, 580 of the piston rod housing 444, 544 and having an open end, a blind bore 465, 565 in the open end and terminating at a closed exterior end 462, 562 for contact with a driving member, wherein the exterior end 462, 562 has a weakening 467, 567 to rupture the pin 460, 560 when the driving member drives the pin 460, 560 toward the piston rod housing 444, 544, and wherein the pin 460, 560 also may have a threaded portion 461, 561 threaded into a corresponding threaded portion of the through bore 480, 580 of the piston rod housing 444, 544 and the weakening 467, 567 may be a chordally extending flat in a side of the closed exterior end 462, 562 of the pin 460, 560.

In any of the embodiments disclosed herein, the driving member may be a machine component, for example, a die plate, or the driving member may be a plate or the like coupled to the piston rod.

In one or more of the forms disclosed herein, the overtravel pressure relief member does not fail during normal use from gas pressure fluctuations in the pressure chamber, for example, over 150-300 bar. Also, the member is retained during an overtravel condition to prevent any secondary hazard. The overtravel pressure relief feature is configured to discharge pressure with overtravel on the order of 0.5 to 1.5 mm. The overtravel pressure relief feature allows for normal operation of a gas spring and is configured for retrofit of existing products, which also can be serviced by an existing product repair kit and procedure.

FIGS. 18-22 illustrate another presently preferred form of an assembly 714. This form is similar in many respects to the forms of FIGS. 1-17 and like numerals between the forms generally designate like or corresponding elements throughout the several views of the drawing figures. Accordingly, the descriptions of the embodiments are incorporated by reference into one another in their entireties, and a description of the common subject matter generally may not be repeated here.

Figure 18:
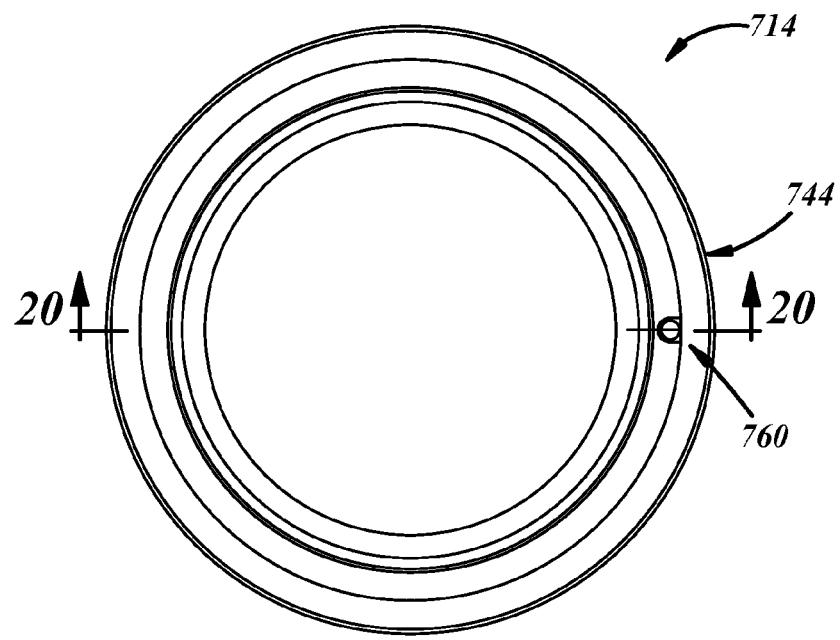
FIG. 18 is a top view of an additional presently preferred form of an assembly of a piston rod housing and an overtravel pressure relief member.
Figure 19:
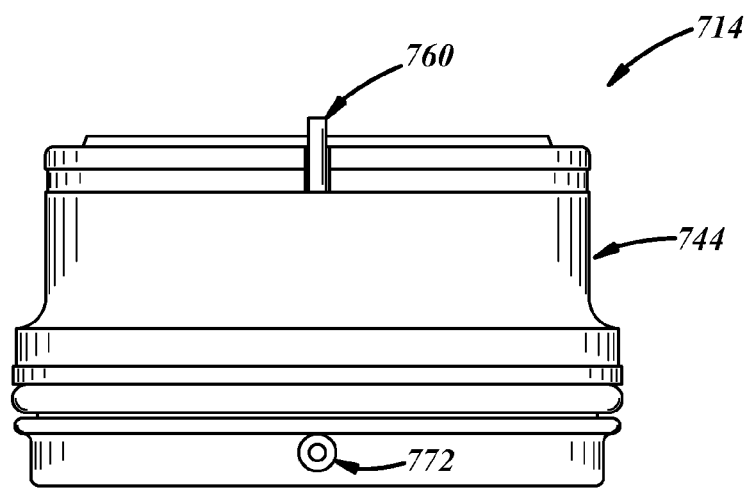
FIG. 19 is a side view of the assembly of FIG. 18.
Figure 20:
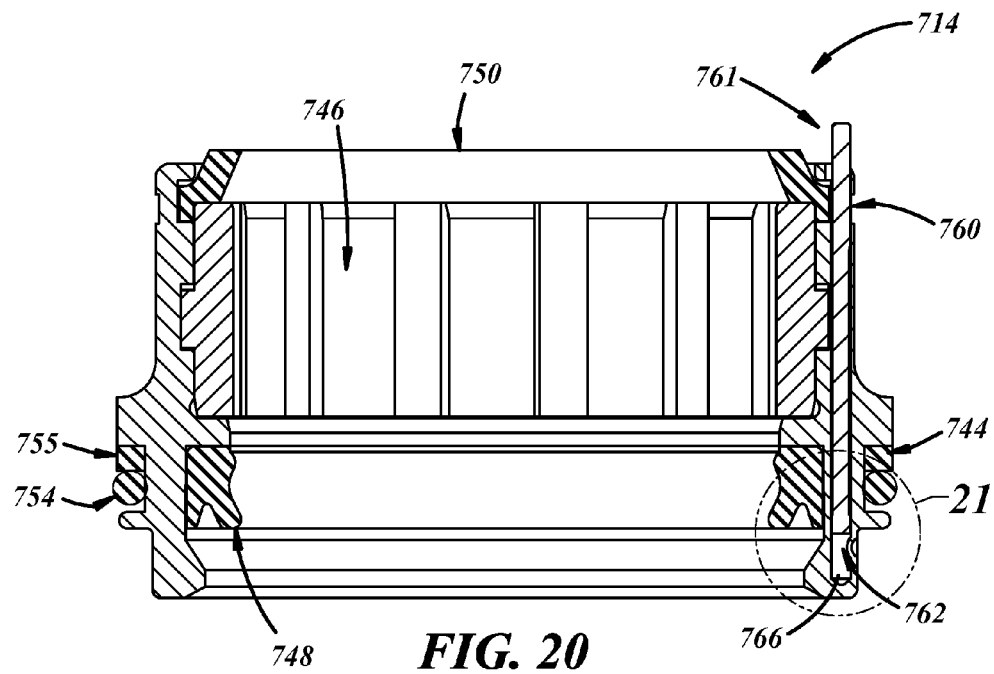
FIG. 20 is a cross-sectional view of the assembly of FIG. 18.

With reference to FIGS. 18-20, the assembly 714 includes a piston rod housing 744, and an overtravel pressure relief pin 760 carried by the housing 744. With reference to FIG. 20, the assembly 714 also may include one or more guide bushings 746, a rod wiper 750, an O-ring casing seal 754, a support ring 755, and a rod seal 748. The relief pin 760 has a forward or exterior end 761 and a rearward or interior end 762, and is carried in a blind passage 766 of the piston rod housing 744 extending between interior and exterior ends of the housing 744.

Figure 21:
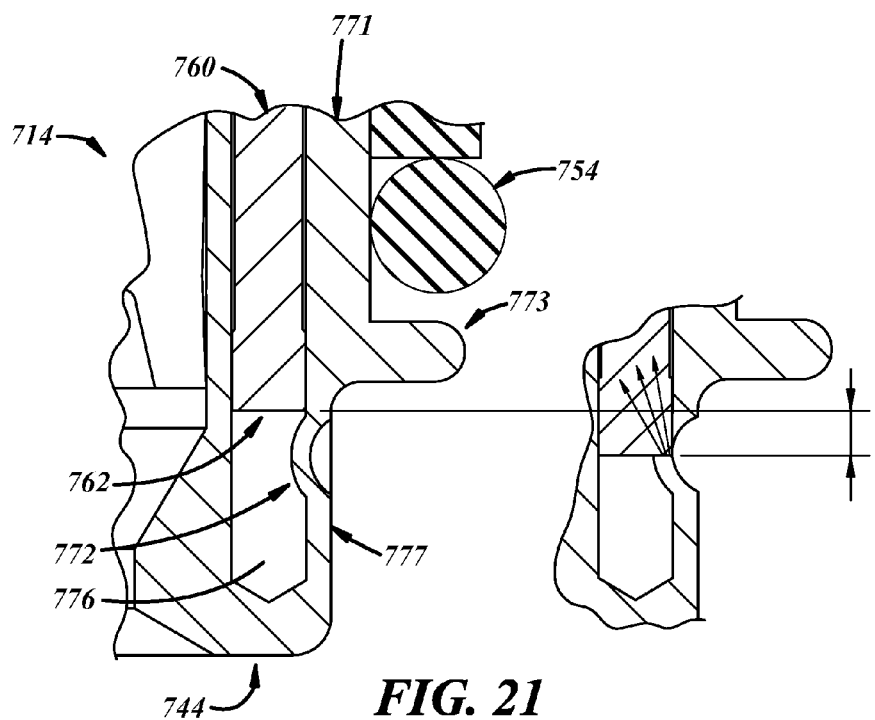
FIG. 21 is an enlarged, fragmentary view of a portion of the assembly as illustrated in FIG. 20.

With reference to FIG. 21, at the interior end of the housing 744, a sidewall includes a longitudinally extending portion 771 and may include a seal groove flange 773 extending radially outwardly therefrom below the seal 754. The sidewall also includes a wall dimple 772 that may be disposed between the seal groove flange 773 and the interior end of the housing 744 and, in any case, intersects the passage 766, for example, by projecting into the passage 766. The wall dimple 772 may be semi-spherical as illustrated or may be rectangular, or of any other suitable shape. In any case, the wall dimple 772 may be produced in a thinned wall portion 777 of the sidewall of the housing 744. The thinned wall portion 777 may be produced by turning an outer diameter of the sidewall, for example, in a location below or behind the flange 773 to achieve a desired reduced wall thickness. Then, the dimple 772 may be produced by indenting or otherwise deforming or displacing the thinned wall portion 777 with a punch, or any other suitable tool.

Figure 22:
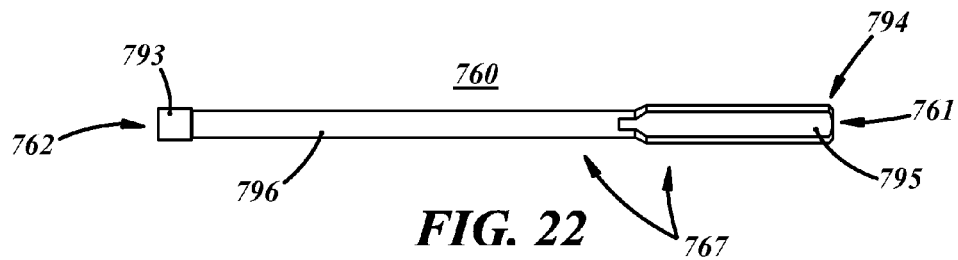
FIG. 22 is a front view of the relief member of FIG. 18.
Figure 23:
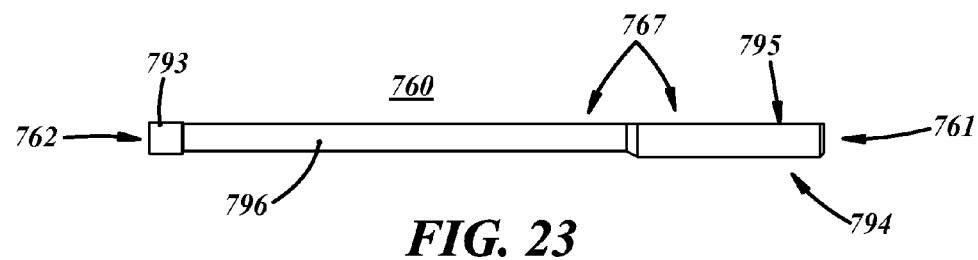
FIG. 23 is a side view of the relief member of FIG. 18.

With reference to FIGS. 22-23, the pin 760 includes a shearing portion 793 at the interior end 762, and a venting portion 767 extending from the shearing portion 793 toward the exterior end 761. The shearing portion 793 of the pin 760 may include a cylindrical head or a head of any other suitable shape. The shearing portion 793 may be interference fit in the passage 766 (FIG. 21) and may be used to rupture the dimple 722 during an overtravel condition, as well as an aid in retaining the pin 760 to the housing 744 (FIG. 21) after the overtravel condition. The venting portion 767 may include a semi-cylindrical head 794 having a flat 795 at the exterior end 761 and an intermediate portion 796 having a radial size less than that of at least one of the cylindrical head or the semi-cylindrical head 794. The head 794 may be interference fit in a corresponding portion of the passage 766 (FIG. 20). The intermediate portion 796 may be cylindrical or of any other suitable shape. Accordingly, with reference to FIGS. 20 and 23, a pressure relief passage may be formed between the venting portion 767 (FIG. 23) and the blind passage 766 (FIG. 20) in the piston rod housing 744 (FIG. 20) when the pin 760 is positioned in the blind passage 766 (FIG. 20).

With reference to FIG. 21, the interior or rearward end 762 of the pin 760 is positioned adjacent to the dimple 772 in the piston rod housing 744 and is positioned to pierce or otherwise breach the dimple 772 in response to being driven into the dimple 772 as a result of an axial force applied to the pin 760. For example, in the event of an overtravel condition where a machine component travels beyond a design intent position, the pin 760 is driven into the housing 744 such that the interior or rearward end 762 of the pin 760 is driven into the wall dimple 772 and through at least a portion thereof to shear at least a portion of the dimple 772. The resulting breach in the dimple 772 allows pressurized gas to escape through a relief path including the passage 766 and opened by the ruptured dimple 772 and extending between the pin 760 and the housing 744 through the passage 766 to the outside atmosphere.

Still referring to FIG. 21, a distance between the interior end of the pin 760 in an as-assembled state of the assembly 714, and the interior end of the pin 760 in an as-ruptured state of the assembly 714, may be, for example, 0.5 to 1.0 mm. Those of ordinary skill in the art will recognize that any suitable such dimension may be chosen for any given specific application. In any case, after rupture, the pin 760 is retained in the housing 744 via the interference fit of the vented head of the pin 760 and the housing 744 and/or via the sealing head of the pin 760 and the housing 744.

Figure 24:
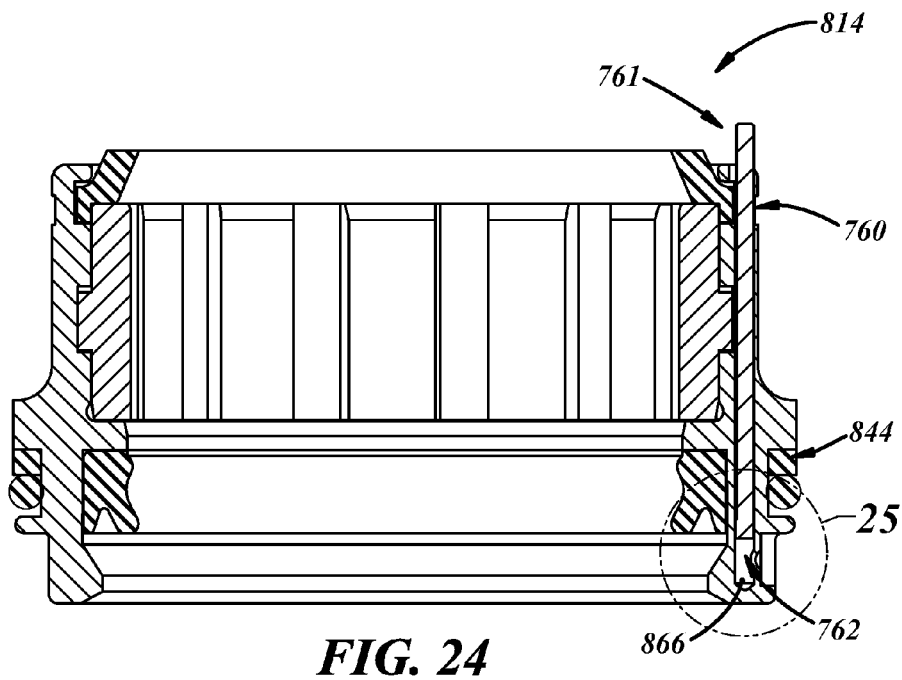
FIG. 24 is a cross-sectional view of a further presently preferred form of an assembly of a piston rod housing and an overtravel pressure relief member.
Figure 25:
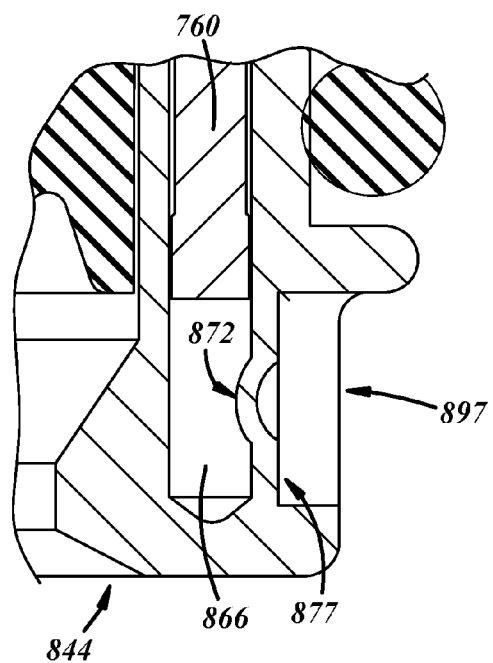
FIG. 25 is an enlarged, fragmentary view of a portion of the assembly as illustrated in FIG. 24.

FIGS. 24-25 illustrate another presently preferred form of an assembly 814. This form is similar in many respects to the forms of FIGS. 1-23 and like numerals between the forms generally designate like or corresponding elements throughout the several views of the drawing figures. Accordingly, the descriptions of the embodiments are incorporated by reference into one another in their entireties, and a description of the common subject matter generally may not be repeated here.

The assembly includes a housing 844 having a blind passage 866 carrying the pin 760, and is substantially similar to the assembly 714 of FIGS. 18-23. But, as illustrated in FIG. 25, a thinned wall portion 877 may be established by milling a portion of a sidewall of the housing 844 instead of by a turning operation. For example, the thinned wall portion 877 may include a bottom wall of a milled pocket 897 as illustrated, or may include a simple spot face, or any other suitable machining, coining, or forming feature. A wall dimple 872 may be established by any suitable tool after a milling operation, or by a blunt end of a milling tool, or in any other suitable manner. The wall dimple 872 intersects the passage 866 for cooperation with the pin 760 as previously described.

One or both of the embodiments of FIGS. 18-25 may enable an easier housing rupture configuration with a shorter pin stroke, which may translate into less actuation-to-venting and less force required to achieve venting. Also, dimpling the housing wall may work harden the housing material, and use of the wall dimple may provide a housing wall with good structural integrity and reduced risk of leakage.

Figure 27:
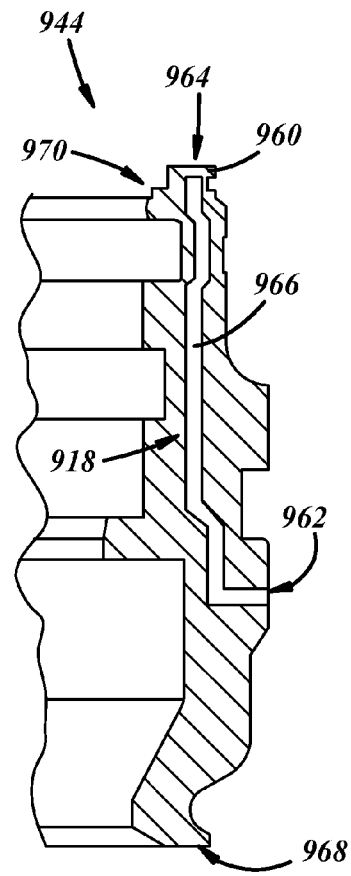
FIG. 27 is a fragmentary sectional view of the piston rod housing of FIG. 26.
Figure 26:
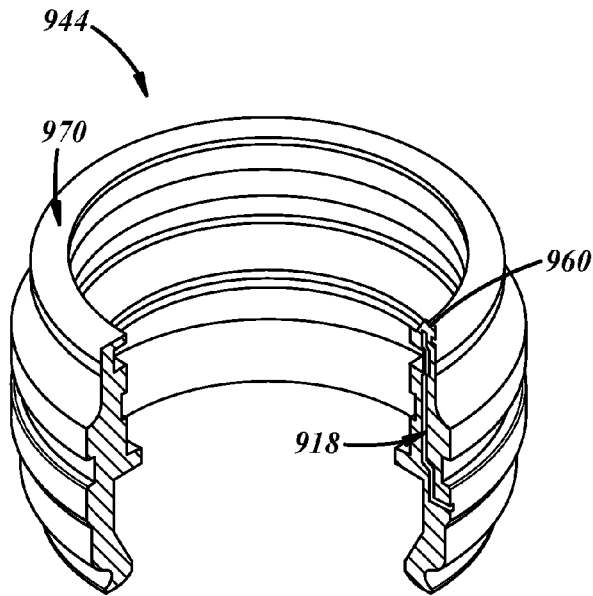
FIG. 26 is a fragmentary sectional view of a presently preferred form of a piston rod housing having an integral overtravel pressure relief member.

FIGS. 26-27 illustrate another presently preferred form of a piston rod housing 944. This form is similar in many respects to the form of FIGS. 1-25 and like numerals between the forms generally designate like or corresponding elements throughout the several views of the drawing figures. Accordingly, the descriptions of the embodiments are incorporated by reference into one another in their entireties, and a description of the common subject matter generally may not be repeated here.

The piston rod housing 944 has an integral overtravel pressure relief feature 918, which may include a passage 966 extending through the housing 944, and a hollow projection 960 in fluid communication with the passage 966. The hollow projection 960 establishes a portion of the passage 966, projects from the exterior end 970 of the housing 944, and terminates in a closed end 964. The hollow projection 960 is an integral portion of the piston rod housing 944. The passage 966 generally extends between an interior end 968 of the housing 944 and an exterior end 970 of the housing 944. The feature 918 also includes an interior end 962 as well as the closed exterior end 964 of the projection 960. As illustrated, the interior end 962 need not intersect the interior end 968 of the housing 944, although it may in other embodiments. In this embodiment, however, the passage 966 includes a predominantly longitudinally extending branch, and a radially or transversely extending branch at the interior end 962 that opens in a location below or behind a seal groove as shown.

As illustrated, the passage 966 need not be straight and, instead, may follow a tortuous path. Accordingly, the feature 918 and the rest of the housing 944 may be produced by stereolithography, or a three-dimensional printing operation that produces the housing 944 and that may include laser sintering, or in any other suitable manner. In embodiments where the passage 966 is straight, the feature and the rest of the housing may be produced by a machining operation that produces the housing.

The hollow projection 960 projects beyond the exterior end 970 of the housing 944. Accordingly, the exterior end 964 of the feature 918 is configured to rupture when struck. For example, in the event of an overtravel condition where a machine component travels beyond a design intent position, the machine component strikes the exterior end 964 of the projection 960, resulting in rupture of the projection 960, for instance, at the exterior end 964 thereof. Accordingly, the exterior end 964 may develop an aperture, which may be a crack, hole, or any other suitable passage to allow pressurized gas to escape therethrough. In any case, such rupture will allow pressurized gas in a pressure chamber to escape through the ruptured projection 960. The projection 960 may be configured similarly as the fittings 460, 560 previously described.

It should be appreciated that one of ordinary skill in the art will recognize other embodiments encompassed within the scope of this invention. The plurality of arrangements shown and described above are merely illustrative and not a complete or exhaustive list or representation. Of course, still other embodiments and implementations can be achieved in view of this disclosure. The embodiments described above are intended to be illustrative and not limiting. The scope of the invention is defined by the claims that follow.

The invention claimed is:

1. A piston rod housing assembly for a gas spring, comprising:
    a piston rod housing including:
        an annular sidewall configured to slidably receive a piston rod;
        an interior end,
        an exterior end axially spaced from the interior end,
        an overtravel pressure relief passage extending generally axially in the sidewall of the piston rod housing and intersecting the exterior end; and
        an overtravel pressure relief member carried in the overtravel pressure relief passage having an exterior end and projecting axially beyond the exterior end of the piston rod housing; and
        a protective cover carried around the exterior end of the overtravel pressure relief member.

2. The assembly of claim 1, wherein the overtravel pressure relief member comprises a hollow projection establishing a portion of the overtravel relief passage, projecting from the exterior end, and terminating in a closed end.

3. The assembly of claim 2, wherein the projection is an integral portion of the piston rod housing.

4. The assembly of claim 1, further comprising:
    the overtravel pressure relief member carried in the overtravel pressure relief passage and having an exterior end that projects axially beyond the piston rod housing.

5. The assembly of claim 4, wherein the overtravel pressure relief member is a pin having a longitudinally extending relief to define an overpressure relief passage between the pin and the piston rod housing.

6. The assembly of claim 4, wherein the overtravel pressure relief member is a tubular member wherein the exterior end is closed.

7. The assembly of claim 6, wherein the tubular member includes an interior end that is open.

8. The assembly of claim 6, wherein the tubular member is coupled to the housing by at least one of an interference fit, swaging, adhesive, or solder.

9. The assembly of claim 6, wherein the tubular member is composed of at least one of steel, copper, brass, or carbon fiber.

10. The assembly of claim 4, wherein the overtravel pressure relief passage is a through passage that also intersects the interior end of the piston rod housing, and the overtravel pressure relief member is a tubular member wherein the exterior end thereof is closed.

11. The gas spring of claim 4, wherein the overtravel pressure relief member is a pin carried in a blind passage of the piston rod housing and having an exterior end for contact with a driving member and an interior end to rupture a portion of the piston rod housing when the driving member drives the pin further into the piston rod housing.

12. The assembly of claim 11, wherein the overtravel pressure relief member includes a hollow rod or a solid pin with an axially extending radial relief, having an interior end with at least one spike and wherein the exterior end is enlarged and configured for press fit retention to the piston rod housing during an overtravel condition.

13. The assembly of claim 11, wherein the pin includes a shearing portion at the interior end, and a venting portion extending from the shearing portion toward the exterior end.

14. The assembly of claim 13, wherein the shearing portion of the pin includes a cylindrical head, and the venting portion includes a semi-cylindrical head having a flat at the exterior end and an intermediate portion having a radial size less than that of at least one of the cylindrical head or the semi-cylindrical head.

15. The assembly of claim 4, wherein the overtravel pressure relief member is a pin carried in a blind passage of the piston rod housing and having an exterior end for contact with a driving member and an interior end for rupturing at least one of a bottom wall or a dimpled sidewall of the piston rod housing when the driving member drives the pin further into the piston rod housing.

16. A piston rod housing assembly for a gas spring, comprising:
a piston rod housing including:
an annular sidewall configured to slidably receive a piston rod;
an interior end,
an exterior end axially spaced from the interior end,
an overtravel pressure relief blind passage extending generally axially in the sidewall of the piston rod housing and intersecting the exterior end;
a wall dimple intersecting the blind passage and configured to be ruptured by the pin during an overtravel condition; and
an overtravel pressure relief pin carried in the overtravel pressure relief blind passage and having an exterior end projecting axially beyond the exterior end of the piston rod housing for contact with a driving member and an interior end to rupture the dimple when the driving member drives the pin further into the piston rod housing.

17. The assembly of claim 16 wherein the housing also has a wall thinning, wherein the dimple is in the wall thinning.

18. A piston rod housing assembly for a gas spring, comprising:
a piston rod housing including:
an annular sidewall configured to slidably receive a piston rod;
an interior end,
an exterior end axially spaced from the interior end,
an overtravel pressure relief blind passage extending generally axially in the sidewall of the piston rod housing and intersecting the exterior end; and
an overtravel pressure relief pin carried in the blind passage in the piston rod housing, projecting axially beyond the exterior end of the piston rod housing, and having an open end, a blind passage in the open end and terminating at a closed exterior end for contact with a driving member, wherein the exterior end has a weakening to rupture the pin when the driving member drives the pin toward the piston rod housing.

19. The assembly of claim 18, wherein the pin also has a threaded portion threaded into a corresponding threaded portion of the through bore of the piston rod housing and the weakening is a chordally extending flat in a side of the closed exterior end of the pin.

20. A gas spring for forming equipment, comprising:
a casing including an axially extending side wall, an open end, a transversely extending closed end wall axially spaced from the open end, a pressure chamber established in part by the side and end walls to receive a gas under pressure;
a piston rod received at least in part in the casing for reciprocation between extended and retracted positions;
a piston rod housing having an annular sidewall received at least in part in the open end of the casing, slidably receiving the piston rod, an interior end communicating with the pressure chamber, and an exterior end axially spaced from the interior end and adjacent the open end of the casing;
an overtravel pressure relief passage extending generally axially in the annular sidewall and intersecting the exterior end of the annular sidewall;
an overtravel pressure relief member carried in the overtravel pressure relief passage and having an exterior end that projects axially beyond the exterior end of the piston rod housing and the open end of the casing; and
a protective cover carried around the exterior end of the overtravel pressure relief member and including a first surface positioned against the exterior end of the housing and a second surface that is flush with or projects axially beyond an axially outer surface of the exterior end of the overtravel pressure relief member.

21. The gas spring of claim 20, further comprising:
the overtravel pressure relief member carried in the overtravel pressure relief passage and having an exterior end that projects axially beyond the piston rod housing; and
the protective cover having a surface that is recessed beneath an axially outer surface of the exterior end of the overtravel pressure relief member, and also includes an axially extending annular portion interengaged with the piston rod housing.

22. A gas spring for forming equipment, comprising:
a casing including an axially extending sidewall, an open end, a transversely extending closed end wall axially spaced from the open end, and a pressure chamber defined in part by the side and end walls to receive a gas under pressure;
a piston rod received at least partially in the casing for reciprocation between extended and retracted positions;
a piston rod housing having an annular sidewall received at least in part in the open end of the casing, slidably receiving the piston rod, an interior end communicating with the pressure chamber, and an exterior end axially spaced from the interior end and adjacent the open end of the casing;
an overtravel pressure relief blind passage extending generally axially in the annular sidewall and intersecting the exterior end of the annular sidewall; and
a pin carried in the blind passage of the piston rod housing, projecting axially beyond the exterior end of the piston rod housing and the open end of the casing for contact with a driving member, and an interior end for rupturing at least one of a portion of the interior end of the piston rod housing or a dimpled sidewall portion of the piston rod housing projecting into the blind passage when the driving member drives the pin further into the piston rod housing to enable gas under pressure in the pressure chamber to escape through the blind passage to the exterior of the gas spring via the ruptured portion of the interior end of the piston rod housing and/or ruptured dimpled sidewall portion of the piston rod housing.

* * * * *